US009734829B2

(12) United States Patent
Ibuki et al.

(10) Patent No.: US 9,734,829 B2
(45) Date of Patent: Aug. 15, 2017

(54) ELECTRONIC DEVICE, CONTROL METHOD, AND CONTROL PROGRAM

(71) Applicant: KYOCERA Corporation, Kyoto-shi, Kyoto (JP)

(72) Inventors: Daisuke Ibuki, Yokohama (JP); Atsuo Chiba, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 14/433,081

(22) PCT Filed: Oct. 4, 2013

(86) PCT No.: PCT/JP2013/077134
§ 371 (c)(1),
(2) Date: Apr. 2, 2015

(87) PCT Pub. No.: WO2014/054794
PCT Pub. Date: Apr. 10, 2014

(65) Prior Publication Data
US 2015/0262578 A1    Sep. 17, 2015

(30) Foreign Application Priority Data

Oct. 5, 2012 (JP) .................. 2012-223541

(51) Int. Cl.
*G10L 15/00* (2013.01)
*G10L 15/22* (2006.01)
(Continued)

(52) U.S. Cl.
CPC .............. *G10L 15/22* (2013.01); *G06F 3/167* (2013.01); *G10L 15/265* (2013.01); *G10L 17/22* (2013.01);
(Continued)

(58) Field of Classification Search
CPC ....... G10L 15/22; G10L 15/30; G10L 15/265; G10L 15/08; G10L 17/005; G10L 17/02
(Continued)

(56) References Cited

U.S. PATENT DOCUMENTS 7,177,816 B2 *   2/2007   Ehlen .................. G10L 15/22
                                                            704/270.1
8,311,835 B2 *  11/2012   Lecoeuche ........ H04M 1/72561
                                                              704/270

(Continued)

FOREIGN PATENT DOCUMENTS

JP   10-222337 A    8/1998
JP   2000-56823 A   2/2000
(Continued)

OTHER PUBLICATIONS

International Search Report mailed Nov. 5, 2013 in corresponding International Application No. PCT/JP2013/077134.
(Continued)

*Primary Examiner* — Vu B Hang
(74) *Attorney, Agent, or Firm* — Hauptman Ham, LLP

(57) ABSTRACT

According to one of aspects, an electronic device includes: a microphone; and a controller configured to perform processing based on a result of recognition of voice received by the microphone, wherein the controller is configured to display a list of applications when the processing fails to be performed based on the result of recognition.

19 Claims, 9 Drawing Sheets

(51) Int. Cl.
*G10L 15/26* (2006.01)
*G06F 3/16* (2006.01)
*G10L 17/22* (2013.01)

(52) U.S. Cl.
CPC ... *G10L 2015/223* (2013.01); *H04M 2250/74* (2013.01)

(58) Field of Classification Search
USPC ............... 704/231, 246, 270, 235, 251, 275
See application file for complete search history.

(56) References Cited

U.S. PATENT DOCUMENTS

| | | | | |
|---|---|---|---|---|
| 8,428,654 | B2* | 4/2013 | Oh | H04M 1/72583 455/414.1 |
| 8,519,963 | B2 | 8/2013 | Kocienda et al. | |
| 8,881,135 | B2 | 11/2014 | Yamamuro | |
| 2007/0088556 | A1* | 4/2007 | Andrew | G10L 15/19 704/270.1 |
| 2009/0254351 | A1 | 10/2009 | Shin et al. | |
| 2010/0105364 | A1* | 4/2010 | Yang | G06F 17/30663 455/414.1 |
| 2010/0185448 | A1* | 7/2010 | Meisel | G10L 15/22 704/256.1 |
| 2011/0238693 | A1* | 9/2011 | Seok | H04M 1/27455 707/769 |
| 2012/0130712 | A1 | 5/2012 | Shin et al. | |
| 2012/0209608 | A1* | 8/2012 | Lee | G10L 15/22 704/246 |

FOREIGN PATENT DOCUMENTS

| | | |
|---|---|---|
| JP | 2001-175381 A | 6/2001 |
| JP | 2007-67511 A | 3/2007 |
| JP | 2007-280179 A | 10/2007 |
| JP | 2009-252238 A | 10/2009 |
| JP | 2011-13808 A | 1/2011 |
| JP | 2011-49885 A | 3/2011 |
| WO | 2008/086302 A1 | 7/2008 |

OTHER PUBLICATIONS

Office Action mailed Apr. 28, 2015, corresponding to Japanese patent application No. 2012-223541, for which an explanation of relevance is attached.

Office Action mailed Dec. 1, 2015, corresponding to Japanese Patent Application No. 2012-223541, for which an explanation of relevance is attached.

Office Action in JP Application No. 2012-223541, mailed May 24, 2016, for which an explanation of relevance is attached.

* cited by examiner

ELECTRONIC DEVICE, CONTROL METHOD, AND CONTROL PROGRAM

CROSS-REFERENCE TO RELATED APPLICATION

This application is a National Stage of PCT international application Ser. No. PCT/JP2013/077134 filed on Oct. 4, 2013 which designates the United States, incorporated herein by reference, and which is based upon and claims the benefit of priority from Japanese Patent Application No. 2012-223541 filed on Oct. 5, 2012, the entire contents of which are incorporated herein by reference.

FIELD

The present application relates to an electronic device, a control method, and a control program.

BACKGROUND

Widely known are touch screen devices including a touch screen. Examples of touch screen devices include, but are not limited to, electronic devices, such as mobile phones, smartphones, and tablets. Touch screen devices detect a gesture performed with a finger, a pen, or a stylus through a touch screen. The touch screen devices operate in response to the detected gesture. Examples of the operation performed in response to the detected gesture are described in Patent Literature 1, for example.

Basic operations of touch screen devices are performed by an operating system (OS) mounted on the devices. Examples of the OS mounted on the touch screen devices include, but are not limited to, Android (registered trademark), BlackBerry (registered trademark) OS, iOS, Symbian (registered trademark) OS, Windows (registered trademark) Phone, etc.

Recently widely used are electronic devices including an interactive interface that enables operations in response not only to a gesture but also to voice input. These electronic devices perform operations, such as activation of an application and a search on the Internet, in response to voice.

CITATION LIST

Patent Literature

Patent Literature 1: PCT Publication No. WO 2008/086302

Technical Problem

An electronic devices including an interactive interface have room for improvement in processing performed via the interactive interface.

SUMMARY

According to one of aspects, an electronic device, comprises: a microphone; and a controller configured to perform processing based on a result of recognition of voice received by the microphone, wherein the controller is configured to display a list of applications when the processing fails to be performed based on the result of recognition.

According to one of aspects, a control method for controlling an electronic device including a microphone, the control method comprises: performing recognition of voice received by the microphone; and displaying a list of applications when processing fails to be performed based on a result of the recognition.

According to one of aspects, a control program causes an electronic device including a microphone to execute: performing recognition of voice received by the microphone; and displaying a list of applications when processing fails to be performed based on a result of the recognition.

DESCRIPTION OF EMBODIMENTS

Embodiments of an electronic device, a control method, and a control program according to the present application will be described in detail with reference to the accompanying drawings. In the following, a smartphone will be described as one of examples of an electronic device.

A First Embodiment

Figure 1:
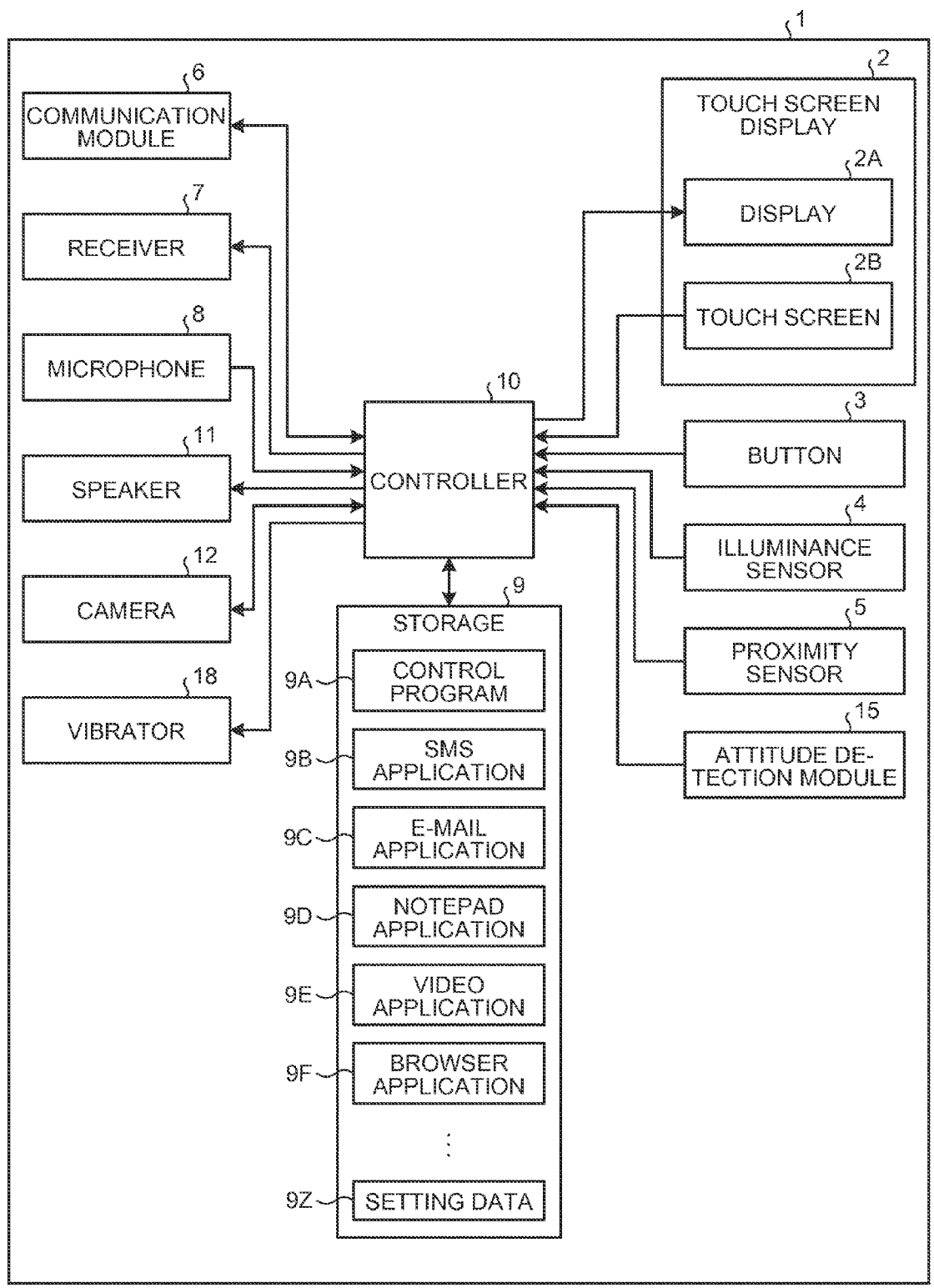
FIG. 1 is a block diagram of a smartphone according to an embodiment.

A functional configuration of a smartphone 1 according to a first one of embodiments will be described with reference to FIG. 1. FIG. 1 is a block diagram of a smartphone according to a first embodiment. In the following description, the same numerals may be assigned to the same elements, and an overlapped explanation may be omitted.

As illustrated in FIG. 1, the smartphone 1 includes a touch screen display 2, a button 3, an illuminance sensor 4, a proximity sensor 5, a communication module 6, a receiver 7, a microphone 8, a storage 9, a controller 10, a speaker 11, a camera 12, an attitude detection module 15, and a vibrator 18.

The touch screen display 2 includes a display 2A and a touch screen 2B. The display 2A and the touch screen 2B, for example, may be arranged in a manner overlapping with each other, side by side, or away from each other. In a case where the display 2A and the touch screen 2B are arranged in an overlapping manner, for example, one or a plurality of sides of the display 2A may be arranged along none of the sides of the touch screen 2B.

The display 2A includes a display device, such as a liquid crystal display (LCD), an organic electro-luminescence display (OELD), and an inorganic electro-luminescence display (IELD). The display 2A displays characters, images, symbols, and graphics, for example. Screens containing the characters, the images, the symbols, and the graphics displayed by the display 2A include a screen called a lock screen and a screen called a home screen. The home screen may be called a desktop, a standby screen, an idle screen, or a standard screen.

The touch screen 2B detects contact of a finger, a pen, or a stylus, for example, with the touch screen 2B. The touch screen 2B can detect a position at which a plurality of fingers, pens, or styluses, for example, (hereinafter, simply referred to as a "finger") come into contact with the touch screen 2B. The touch screen 2B notifies the controller 10 of the contact of the finer with the touch screen 2B (touch screen display 2) and the position of the contact on the touch screen display 2.

The detection system of the touch screen 2B may be a desired system, such as a capacitance system, a resistive film system, a surface acoustic wave system (or an ultrasonic system), an infrared system, an electromagnetic induction system, and a load detection system. To simplify the following description, it is assumed that a user comes into contact with the touch screen 2B with his/her finger to operate the smartphone 1.

The controller 10 (smartphone 1) determines the type of a gesture based on at least one of contact detected by the touch screen 2B, the position at which the contact is detected, a change in the position at which the contact is detected, an interval between detection of the contact, and the number of times of detection of the contact. The gesture is an operation performed on the touch screen 2B (touch screen display 2) with the finger. Examples of the gesture determined by the controller 10 (smartphone 1) through the touch screen 2B include, but are not limited to, a touch, a long-touch, releasing, a swipe, a tap, a double-tap, a long-tap, dragging, a flick, a pinch-in, a pinch-out, etc.

The button 3 receives an operation input from a user. A single or a plurality of buttons 3 may be provided.

The illuminance sensor 4 detects illuminance of ambient light of the smartphone 1. The illuminance indicates the intensity, the brightness, or the luminance of light. The illuminance sensor 4 is used to adjust the luminance of the display 2A, for example.

The proximity sensor 5 detects existence of a neighboring object in a non-contact manner. The proximity sensor 5 detects the existence of an object based on the change of a magnetic field and the change of returning time of reflected waves of ultrasonic waves, for example. The proximity sensor 5 detects the approach of the display 2A to a face, for example. The illuminance sensor 4 and the proximity sensor 5 may be configured as a single sensor. The illuminance sensor 4 may be used as a proximity sensor.

The communication module 6 performs communication wirelessly. The wireless communication standards supported by the communication module 6 include communication standards of cellular phones such as 2G, 3G, and 4G, and short range wireless communication standards. The communication standards of cellular phones include the long term evolution (LTE), the wideband code division multiple access (W-CDMA), the worldwide interoperability for microwave access (WiMax), the CDMA2000, the personal digital cellular (PDC), the global system for mobile communications (GSM) (registered trademark), and the personal handyphone system (PHS), for example. The short range wireless communication standards include the IEEE802.11, the Bluetooth (registered trademark), the infrared data association (IrDA), the near field communication (NFC), and the wireless personal area network (WPAN), for example. The communication standard of the WPAN includes the ZigBee (registered trademark), for example. The communication module 6 may support one or a plurality of the above-described communication standards.

The communication module 6 receives radio wave signals of a given frequency band from a global positioning system (GPS) satellite, performs decoding processing of the received radio wave signals, and transmits the processed signals to the controller 10. In the smartphone 1, the function for performing communication with a GPS satellite may be separated from the communication module 6, and a separate communication module independent from the communication module 6 may be provided.

The receiver 7 is included in a voice output module. The receiver 7 outputs voice signals transmitted from the controller 10 as voice. The receiver 7 is used to output voice of an opposite party during a telephone conversation, for example. The microphone 8 is included in a voice input module. The microphone 8 converts voice of a user, for example, into voice signals and transmits them to the controller 10.

The storage 9 stores therein computer programs and data. The storage 9 is also used as a work area for temporarily storing processing results of the controller 10. The storage 9 may include an arbitrary non-transitory storage medium such as a semiconductor storage medium and a magnetic storage medium. The storage 9 may include a plurality of kinds of storage media. The storage 9 may include the combination of a portable storage medium such as a memory card, an optical disk, or a magneto-optical disk, and a storage medium reading device. The storage 9 may include a storage device used as a temporary storage area such as a random access memory (RAM).

The computer programs stored in the storage 9 includes applications executed in the foreground or the background, and control programs for supporting operation of the applications. In the application executed in the foreground, a screen is displayed on the display 2A, for example. The control programs include an OS, for example. The applications and the control programs may be installed in the storage 9 through wireless communication by the communication module 6 or a non-transitory storage medium.

The storage 9 stores therein a control program 9A, a short message service (SMS) application 9B, an e-mail application 9C, a notepad application 9D, a video application 9E, a browser application 9F, and setting data 9Z, for example.

The control program 9A provides a function relating to various kinds of control to operate the smartphone 1. The control program 9A provides an interactive interface function. The interactive interface function includes a function to display an execution screen indicating that the interactive interface function is being executed on the display 2A. The interactive interface function includes a function to recognize voice received by the microphone 8 and respond thereto with sound or characters, for example, based on the recognition result.

The control program 9A provides a function to recognize voice received from the user and perform processing based on the recognition result. This function includes a function to automatically activate an application corresponding to the recognition result out of the list of applications stored in the storage 9 when the recognition of voice succeeds.

The control program 9A provides a function to recognize voice received from the user and display the list of applications stored in the storage 9 when processing fails to be performed based on the recognition result. The case where processing fails to be performed based on the recognition result includes a case where the recognition of voice fails or a case where it is determined that no application corresponding to the recognition result can be detected out of the applications stored in the storage 9, for example.

In addition, the control program 9A controls the communication module 6, for example, to provide a function for achieving communication using the LTE, the W-CDMA, the WiMax, the CDMA2000, the PDC, the GSM (registered trademark), and the PHS, for example.

The control program 9A controls the communication module 6, for example, to provide a function for achieving short range wireless communication using the IEEE802.11, the Bluetooth (registered trademark), the IrDA, the NFC, and the WPAN, for example.

The control program 9A controls the communication module 6 and the microphone 8, for example, to provide a function for achieving telephone conversations.

To carry out a telephone conversation, the functions provided by the control program 9A may be used in combination with a function provided by another computer program stored in the storage 9, such as a telephone conversation application or an e-mail application. The interactive interface function provided by the control program 9A, for example, may be used in combination with another function provided by the control program 9A. The functions provided by the control program 9A may be divided into a plurality of program modules or combined with another computer program. The interactive interface function provided by the control program 9A, for example, may be provided to another module.

The SMS application 9B provides a function to transmit and receive an e-mail having a predetermined number or less of characters as SMS. The e-mail application 9C provides an e-mail function to compose, transmit, receive, and display an e-mail, for example. The notepad application 9D provides a text editor function to create and manage text data. The video application 9E provides a function to reproduce video, for example. The browser application 9F provides a browsing function. The applications stored in the storage 9 are given by way of example only. Besides the applications illustrated in FIG. 1, a plurality of applications may be stored, including a telephone conversation application, a navigation application, a music player application, a calculator application, and a tag application.

The setting data 9Z includes information on various kinds of settings and processing relating to the operation of the smartphone 1.

The controller 10 is included in an arithmetic processor. The arithmetic processor includes a central processing unit (CPU), a system-on-a-chip (SoC), a micro control unit (MCU), and a field-programmable gate array (FPGA), for example. However, an embodiment is not limited thereto. The controller 10 integrally controls the action of the smartphone 1 to achieve various functions.

Specifically, the controller 10 executes instructions included in the computer programs stored in the storage 9 while referring to data stored in the storage 9 as needed. The controller 10 controls functional modules in accordance with the data and the instructions, thereby carrying out various functions. Examples of the functional modules include, but are not limited to, the display 2A, the communication module 6, the microphone 8, the speaker 11, etc. The controller 10 may change control depending on detection results of detection modules. Examples of the detection modules include, but are not limited to, the touch screen 2B, the button 3, the illuminance sensor 4, the proximity sensor 5, the microphone 8, the camera 12, the attitude detection module 15, etc.

The controller 10 executes the control program 9A, thereby performing processing of the interactive interface. The controller 10, for example, displays the execution screen indicating that the interactive interface function is being executed on the display 2A. The controller 10, for example, recognizes voice received by the microphone 8 and responds thereto with sound or characters, for example, based on the recognition result.

The controller 10 executes the control program 9A, thereby recognizing voice received from the user and performing processing based on the recognition result. When the recognition of voice succeeds, for example, the controller 10 automatically activates an application corresponding to the recognition result out of the list of applications stored in the storage 9.

The controller 10 executes the control program 9A, thereby recognizing voice received from the user and displaying the list of applications stored in the storage 9 when processing fails to be performed based on the recognition result. The case where processing fails to be performed based on the recognition result includes a case where the recognition of voice fails or a case where it is determined that no application corresponding to the recognition result can be detected out of the applications stored in the storage 9, for example.

The speaker 11 is included in a sound output module. The speaker 11 outputs sound signals transmitted from the controller 10 as sound. The speaker 11 is used to output incoming sound and music, for example. One of the receiver 7 and the speaker 11 may have the function of the other.

The camera 12 converts a photographed image into electric signals. The camera 12 includes an in-camera for photographing an object facing the display 2A and an out-camera for photographing an object facing the opposite face of the display 2A, for example.

The attitude detection module 15 detects the attitude of the smartphone 1. In order to detect the attitude, the attitude detection module 15 includes at least one of an acceleration sensor, a direction sensor, and a gyroscope.

The vibrator 18 vibrates one part or the entire of the smartphone 1. In order to generate vibration, the vibrator 18 includes a piezoelectric element or an eccentric motor, for example. The vibration by the vibrator 18 is used to notify a user of various events such as an incoming call.

The functional configuration of the smartphone 1 illustrated in FIG. 1 is an embodiment, and may be appropriately modified in a range not impairing the scope of the disclosure.

An example of processing performed by the smartphone 1 according to a first embodiment will be described with reference to FIG. 2 and FIG. 3. F1 illustrated in FIG. 2 and FIG. 3 indicates the finger of the user. The following describes an example of processing performed when what is called a lock screen is displayed on the display 2A with reference to FIG. 2 and FIG. 3. The same processing can be performed in any situation where the interactive interface is capable of being activated. In the following description, an "operation" may indicate a desired touch gesture that can be detected by the smartphone 1 (controller 10) through the touch screen 2B.

Figure 2:
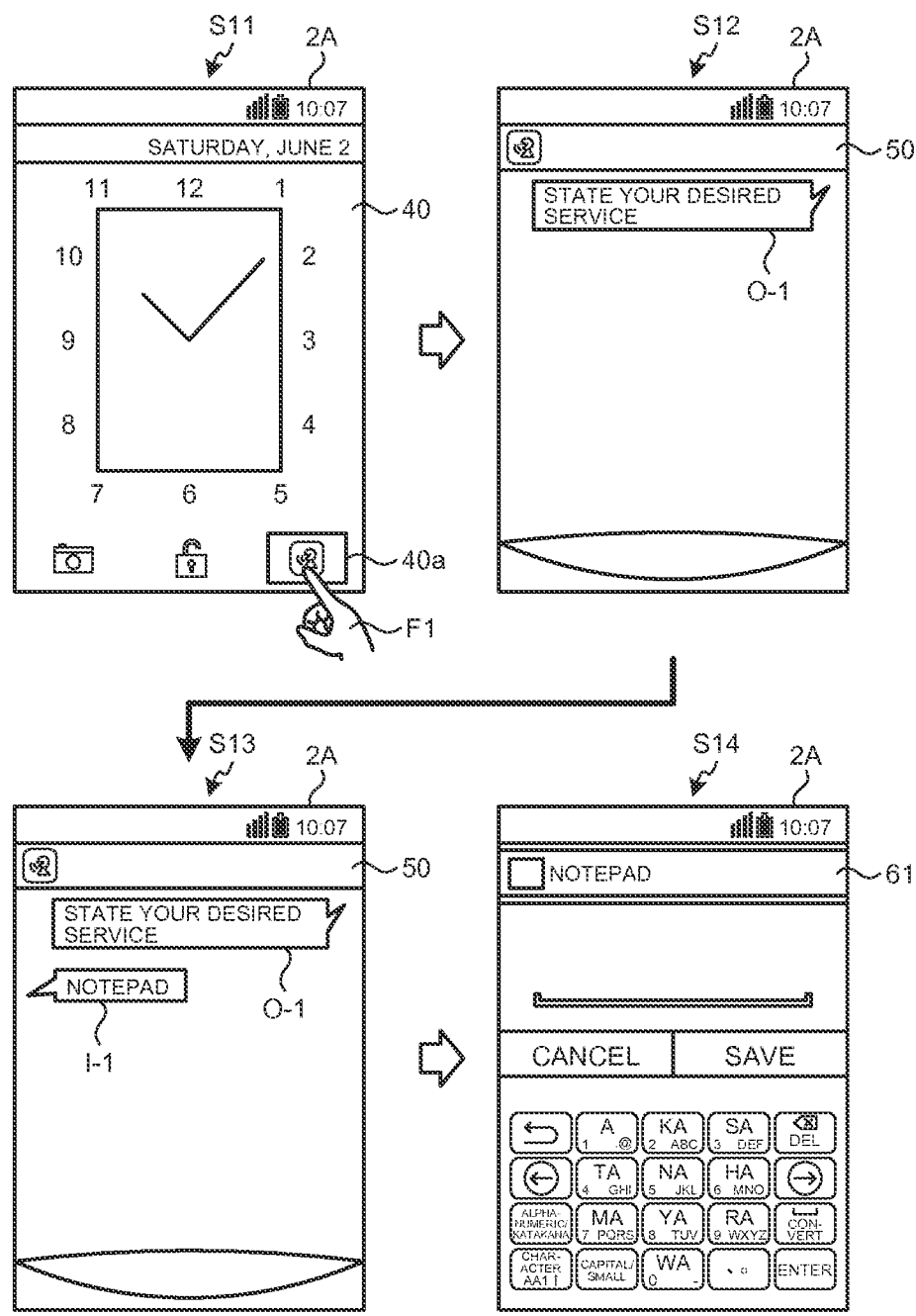
FIG. 2 is a diagram of an example of processing performed when recognition of voice succeeds.

FIG. 2 is a diagram of an example of processing performed when recognition of voice succeeds. As illustrated in FIG. 2, the smartphone 1 displays a lock screen 40 on the display 2A. The lock screen 40 is displayed when the smartphone 1 is in a locked state. When the lock screen 40 is displayed on the display 2A, the smartphone 1 does not accept any operation from the user except for specific operations. The specific operations include an operation to cancel the locked state and an operation to display a notification screen on the display 2A, for example. The locked state may include a security locked state besides a state where no operation is accepted from the user. As illustrated in FIG. 2, the lock screen 40 includes an icon 40a used to activate the interactive interface.

When the smartphone 1 detects an operation on the icon 40a arranged on the lock screen 40 through the touch screen 2B (Step S11), the smartphone 1 displays an execution screen 50 of the interactive interface on the display 2A (Step S12). The smartphone 1 outputs a sound guidance from the speaker 11 and displays characters corresponding to the sound guidance in a balloon on the display 2A. The smartphone 1, for example, outputs a sound guidance of "state your desired service" and displays characters (O-1) corresponding to the sound guidance on the execution screen 50.

When voice is received by the microphone 8, the smartphone 1 performs recognition of the received voice. When the recognition succeeds, the smartphone 1 automatically activates an application corresponding to the recognition result and displays the screen of the application on the display 2A (Step S13 to Step S14). When the smartphone 1 recognizes the voice received by the microphone 8 as "notepad", for example, the smartphone 1 activates the notepad application 9D and displays a screen 61 of the notepad application 9D on the display 2A.

In the processing at Step S13 to Step S14, the smartphone 1 displays characters corresponding to the voice in a balloon on the execution screen 50 based on the result of recognition of the voice received by the microphone 8. The smartphone 1, for example, displays characters (I-1) of "notepad" on the execution screen 50. When activating an application, the smartphone 1 may output a sound guidance indicating the activation. The smartphone 1, for example, may output a sound guidance of "activate the notepad".

Figure 3:
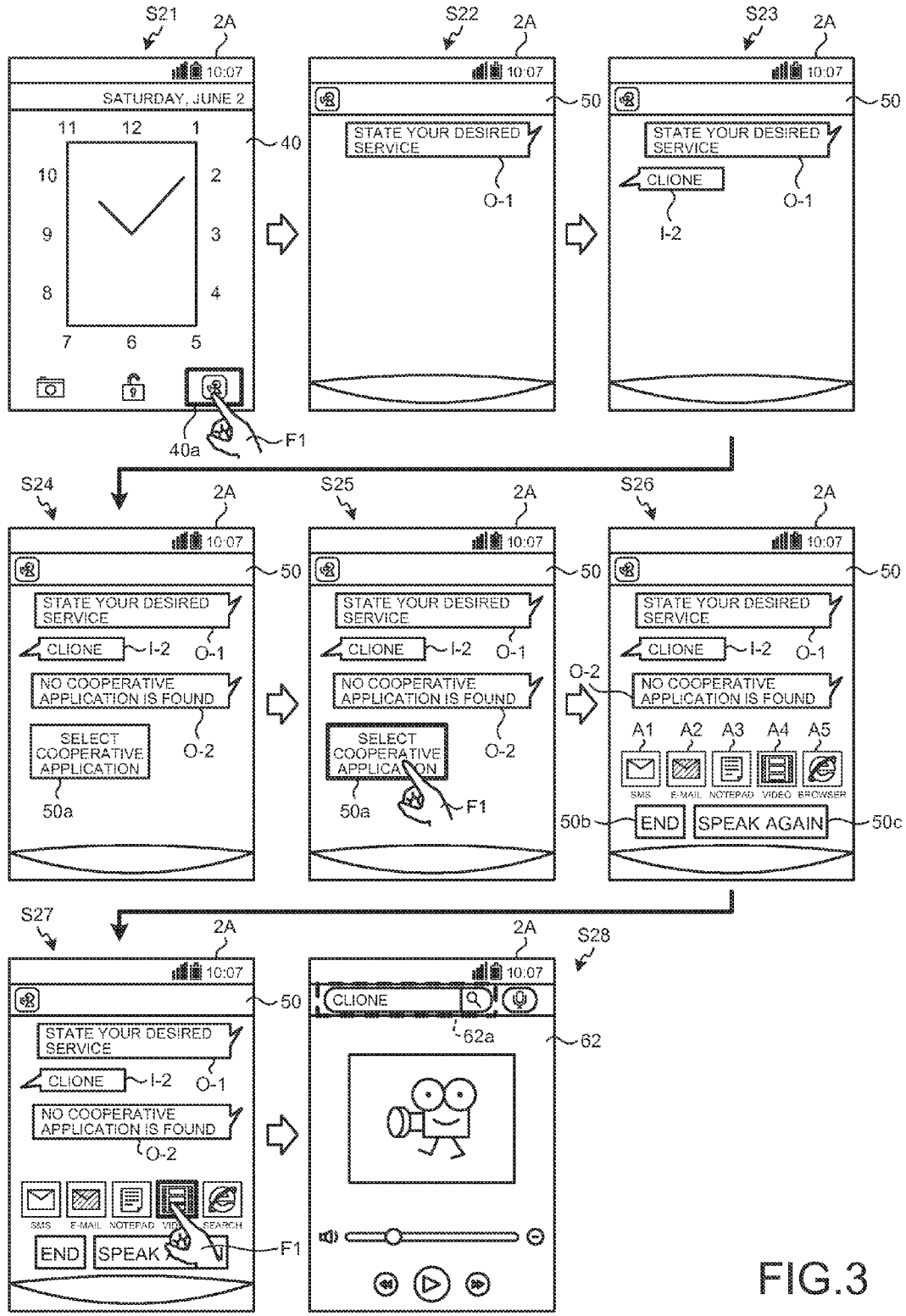
FIG. 3 is a diagram of an example of processing performed when it is determined that no application corresponding to the result of voice recognition can be detected.

FIG. 3 is a diagram of an example of processing performed when it is determined that no application corresponding to the result of voice recognition can be detected. In the following description, a "cooperative application" corresponds to an application stored in the storage 9.

As illustrated in FIG. 3, the smartphone 1 displays the lock screen 40 on the display 2A. When the smartphone 1 detects an operation on the icon 40a arranged on the lock screen 40 (Step S21), the smartphone 1 displays the execution screen 50 of the interactive interface on the display 2A (Step S22).

When voice is received by the microphone 8, the smartphone 1 performs recognition of the received voice. When it is determined that no application corresponding to the result of voice recognition can be detected, the smartphone 1 displays a button 50a on the execution screen 50 (Step S23 to Step S24). The button 50a is used to display the list of applications stored in the storage 9. The list of applications includes an application that enables input of character information.

At Step S23 to Step S24 in FIG. 3, the smartphone 1 displays characters corresponding to the voice in a balloon on the execution screen 50 based on the result of recognition of the voice received by the microphone 8. The smartphone 1, for example, displays characters (I-2) of "clione" on the execution screen 50. When it is determined that no application corresponding to the recognition result is stored in the storage 9, the smartphone 1 may output a sound guidance indicating that no application to be activated is detected and display characters corresponding to the sound guidance in a balloon on the display 2A. The smartphone 1, for example, may output a sound guidance of "no cooperative application is found" and display characters (O-2) corresponding to the sound guidance on the execution screen 50.

When the smartphone 1 detects an operation on the button 50a displayed on the execution screen 50 through the touch screen 2B (Step S25), the smartphone 1 displays the list of applications on the execution screen 50 (Step S26). The execution screen 50 displays an icon A1 corresponding to the SMS application 9B, an icon A2 corresponding to the e-mail application 9C, an icon A3 corresponding to the notepad application 9D, an icon A4 corresponding to the video application 9E, and an icon A5 corresponding to the browser application 9F. The smartphone 1 displays a button 50b used to terminate the interactive interface and a button 50c used to reinput voice on the execution screen 50.

When the smartphone 1 detects an operation on the icon A4 corresponding to the video application 9E through the touch screen 2B (Step S27), the smartphone 1 activates the video application 9E and displays a screen 62 of the video application 9E on the display 2A (Step S28). When activating the video application 9E, the smartphone 1 may transmit the result of voice recognition to the video application 9E and display the screen 62 with the characters corresponding to the result of voice recognition input in a search input box 62a on the screen 62, for example.

In a case where the smartphone 1 succeeds in recognition of voice received by the microphone 8 via the interactive interface but detects no application corresponding to the result of voice recognition, the smartphone 1 cannot activate an application automatically. As illustrated in FIG. 3, the smartphone 1 may possibly recognize the received voice as "clione" but detect no application corresponding to "clione", for example. When the smartphone 1 detects no application corresponding to the result of voice recognition, the smartphone 1 displays the list of applications, thereby causing the user to select the application. As described above, a first embodiment can perform the processing, which is conventionally terminated with failure in activation of an application, and eventually activate the application. Thus, it is possible to improve the processing performed via the interactive interface.

The smartphone 1 may transmit the result of recognition of voice received by the microphone 8 as character information, for example, to the application to be activated out of the list of applications. Thus, the smartphone 1 can effectively use the communications on the interactive interface.

The smartphone 1 may omit the processing at Step S23 to Step S24 illustrated in FIG. 3. When it is determined that no application corresponding to the result of voice recognition can be detected, the smartphone 1 may directly display the list of cooperative applications, the voice reinput button, and the end button on the execution screen 50 without performing the processing at Step S23 to Step S24.

The explanation has been made of an example of the processing performed by the smartphone 1 when it is determined that no application corresponding to the result of voice recognition can be detected with reference to FIG. 3. The same processing as the processing illustrated in FIG. 3 may be performed also when the recognition of voice received by the microphone 8 fails, for example. In this case, the smartphone 1 may not display characters corresponding to the received voice or may predict and display more likely characters based on the recognition result at Step S23 to Step S24 in FIG. 3.

Figure 4:
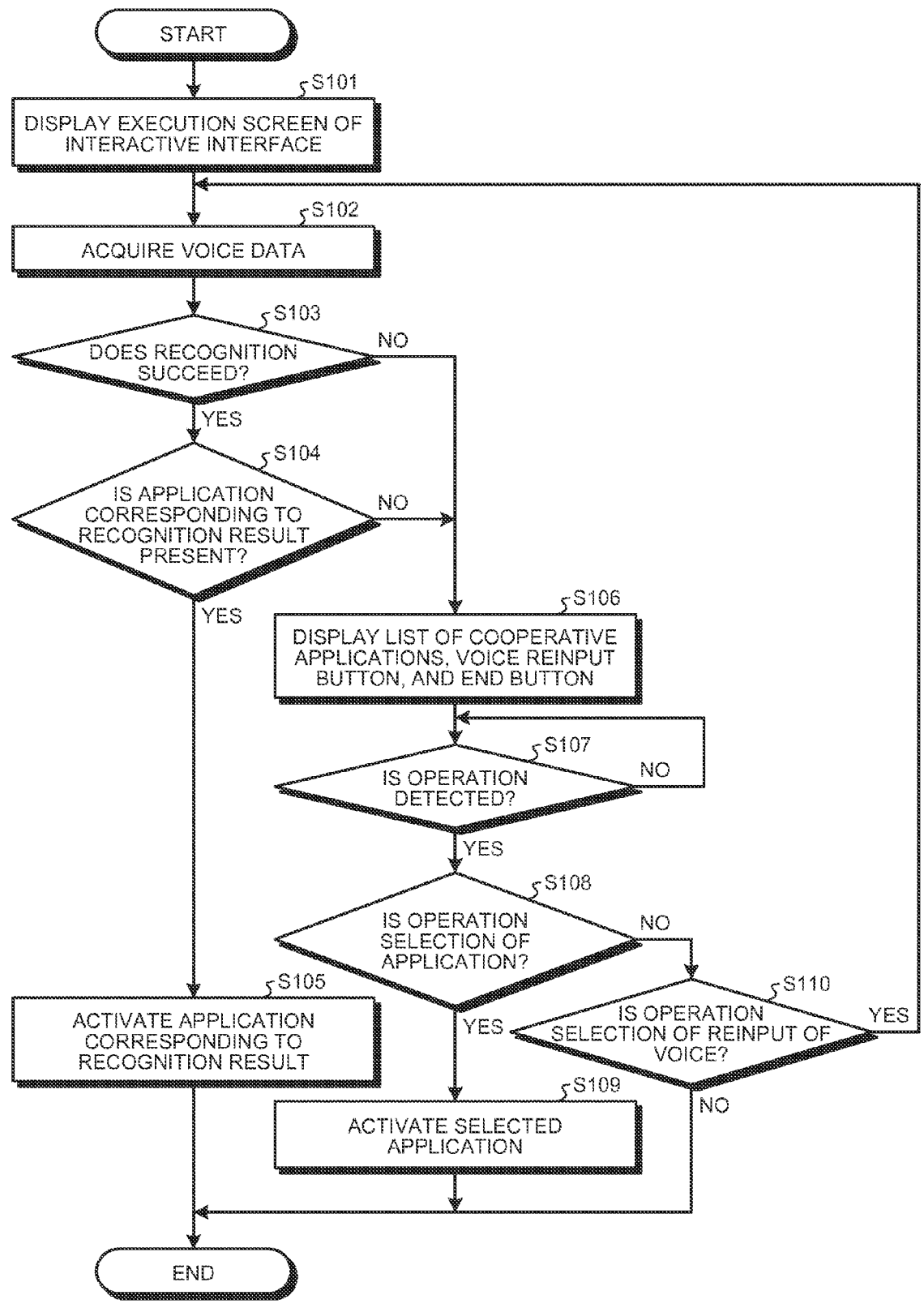
FIG. 4 is a flowchart of an example of a process performed by a smartphone according to a first one of embodiments.

The following describes an example of a process performed by the smartphone 1 according to a first embodiment with reference to FIG. 4. The process illustrated in FIG. 4 is performed by the controller 10 executing the control program 9A and the like stored in the storage 9.

As illustrated in FIG. 4, the controller 10 displays the execution screen 50 of the interactive interface on the display 2A (Step S101). When the controller 10 detects an operation on the icon 50a to activate the interactive interface through the touch screen 2B, for example, the controller 10 activates the interactive interface and displays the execution screen 50 of the interface on the display 2A (refer to FIG. 2 and FIG. 3).

When the controller 10 acquires voice data of voice received by the microphone 8 (Step S102), the controller 10 performs recognition of the voice data and determines whether the recognition of voice succeeds (Step S103).

When the recognition of voice succeeds (Yes at Step S103) as a result of determination, the controller 10 determines whether an application corresponding to the recognition result can be detected out of the applications stored in the storage 9 (Step S104).

When an application corresponding to the recognition result can be detected (Yes at Step S104) as a result of determination, the controller 10 activates the corresponding application (Step S105) and finishes the process illustrated in FIG. 4.

By contrast, when no application corresponding to the recognition result can be detected (No at Step S104) as a result of determination, the controller 10 displays the button 50a (refer to FIG. 3) used to display the list of applications on the execution screen 50. Immediately after detecting an operation on the button 50a, the controller 10 displays the list of cooperative applications, the voice reinput button, and the end button on the execution screen 50 (Step S106). When no application corresponding to the recognition result can be detected, the controller 10 may perform another process without performing the process of displaying the button 50a on the execution screen 50 and displaying the list of cooperative applications and the like on the execution screen 50 immediately after detecting an operation on the button 50a. When no application corresponding to the recognition result can be detected, the controller 10 may immediately display the list of cooperative applications, the voice reinput button, and the end button on the execution screen 50, for example.

Subsequently, the controller 10 determines whether an operation on the execution screen 50 is detected through the touch screen 2B (Step S107).

When no operation on the execution screen 50 is detected (No at Step S107) as a result of determination, the controller 10 repeats the determination at Step S107 until an operation on the execution screen 50 is detected.

When an operation on the execution screen 50 is detected (Yes at Step S107) as a result of determination, the controller 10 determines whether the detected operation is selection of an application (Step S108). The controller 10 determines whether the operation detected through the touch screen 2B is an operation on any one of the icons A1 to A5 (refer to FIG. 3) displayed on the execution screen 50.

When the detected operation is selection of an application (Yes at Step S108) as a result of determination, the controller 10 activates the selected application (Step S109) and finishes the process illustrated in FIG. 4.

By contrast, when the detected operation is not selection of an application (No at Step S108) as a result of determination, the controller 10 determines whether the detected operation is selection of reinput of voice (Step S110). The controller 10 determines whether the operation detected through the touch screen 2B is an operation on the button 50c (refer to FIG. 3) displayed on the execution screen 50.

When the detected operation is selection of reinput of voice (Yes at Step S110) as a result of determination, the controller 10 is returned to the process at Step S102, reacquires voice data received by the microphone 8, and continues to perform the process subsequent thereto.

When the detected operation is not selection of reinput of voice (No at Step S110) as a result of determination, the controller 10 determines that the operation is termination of the interactive interface and finishes the process illustrated in FIG. 4. When the operation detected through the touch screen 2B is not an operation on the button 50c, the controller 10 determines that the operation is an operation on the button 50b (refer to FIG. 3) to terminate the interactive interface and finishes the process illustrated in FIG. 4.

When the recognition of voice fails at Step S103 (No at Step S103) as a result of determination, the controller 10 proceeds to the process at Step S106 and continues to perform the process subsequent thereto. The controller 10 displays the list of cooperative applications, the voice reinput button, and the end button on the execution screen 50 and waits for detection of an operation performed by the user on the execution screen 50.

The order of the process illustrated in FIG. 4 is not limited to an example illustrated in FIG. 4. For example, the determination in the process at Step S108 and the determination in the process at Step S110 may be performed in reverse order.

In the process illustrated in FIG. 4, the list of cooperative applications and the like are displayed on the execution screen 50 when the recognition of voice fails. However, an embodiment is not limited thereto.

Alternatively, the list of cooperative applications and the like may be displayed on the execution screen 50 when the recognition of voice successively fails a certain number of times, for example. Thus, it is possible to quickly respond to failure in activation of an application because of an error in voice input, for example.

The control program 9A provides a function to display the list of cooperative applications and the like on the execution screen 50 when the recognition of voice successively fails a certain number of times. The number of times of failure in the voice recognition is not restricted to a particular number and may be a desired number.

The controller 10 executes the control program 9A, thereby displaying the list of cooperative applications and the like on the execution screen 50 when the recognition of voice successively fails a certain number of times.

Figure 5:
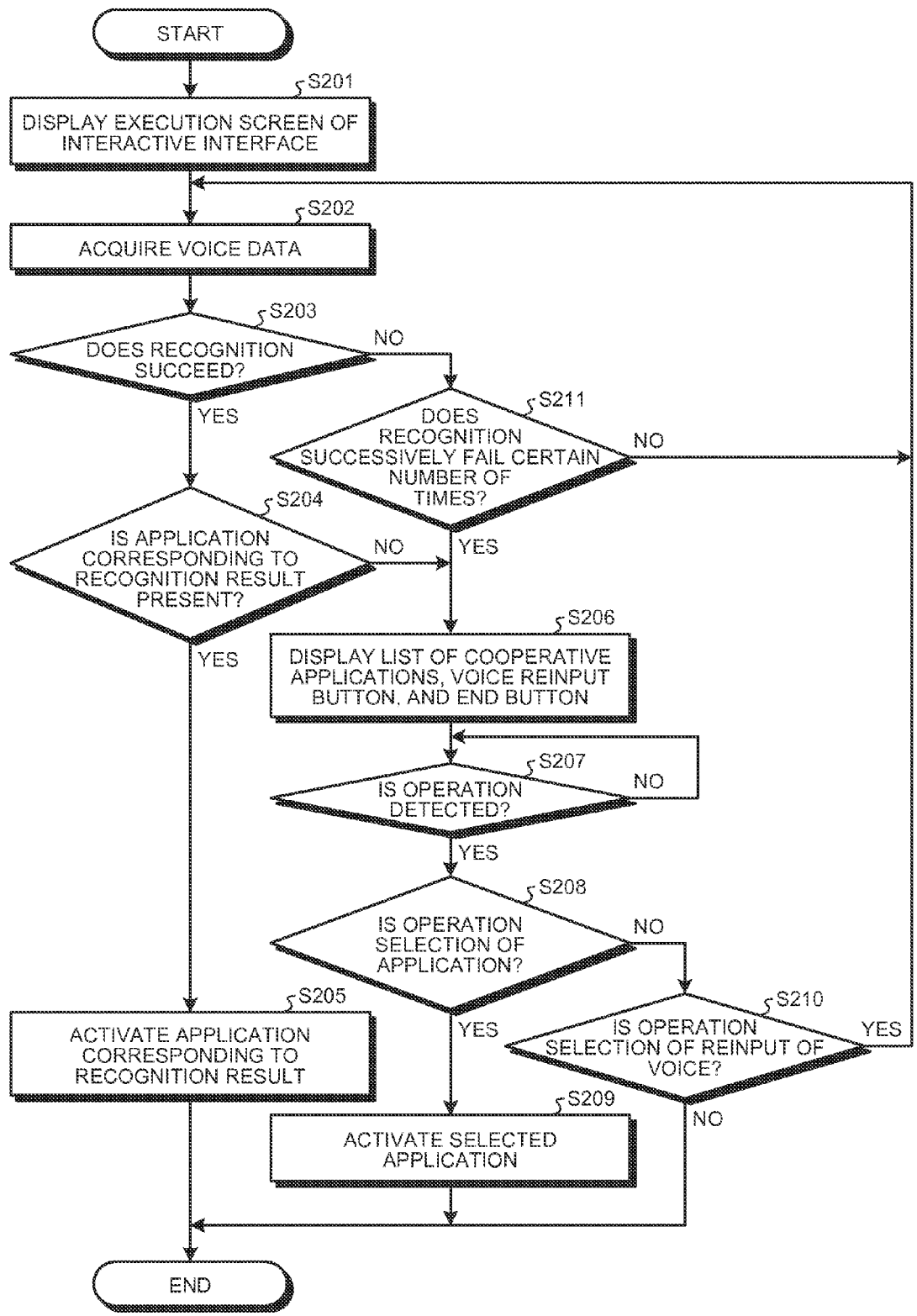
FIG. 5 is a flowchart of another example of the process performed by the smartphone according to a first embodiment.

FIG. 5 is a flowchart of another example of the process performed by the smartphone 1 according to a first embodiment. The process illustrated in FIG. 5 is performed by the controller 10 executing the control program 9A and the like stored in the storage 9. The process illustrated in FIG. 5 includes the process at Step S211 besides the process illustrated in FIG. 4.

As illustrated in FIG. 5, the controller 10 displays the execution screen 50 of the interactive interface on the display 2A (Step S201). When the controller 10 detects an operation on the icon 50a to activate the interactive interface through the touch screen 2B, for example, the controller 10 activates the interactive interface and displays the execution screen 50 of the interface on the display 2A (refer to FIG. 2 and FIG. 3).

When the controller 10 acquires voice data of voice received by the microphone 8 (Step S202), the controller 10 performs recognition of the voice data and determines whether the recognition of voice succeeds (Step S203).

When the recognition of voice succeeds (Yes at Step S203) as a result of determination, the controller 10 determines whether an application corresponding to the recognition result can be detected out of the applications stored in the storage 9 (Step S204).

When an application corresponding to the recognition result can be detected (Yes at Step S204) as a result of determination, the controller 10 activates the corresponding application (Step S205) and finishes the process illustrated in FIG. 5.

By contrast, when no application corresponding to the recognition result can be detected (No at Step S204) as a result of determination, the controller 10 displays the button 50a (refer to FIG. 3) used to display the list of applications on the execution screen 50. Immediately after detecting an operation on the button 50a, the controller 10 displays the list of cooperative applications, the voice reinput button, and the end button on the execution screen 50 (Step S206). When no application corresponding to the recognition result can be detected, the controller 10 may perform another process without performing the process of displaying the button 50a on the execution screen 50 and displaying the list of cooperative applications and the like on the execution screen 50 immediately after detecting an operation on the button 50a. When no application corresponding to the recognition result can be detected, the controller 10 may immediately display the list of cooperative applications, the voice reinput button, and the end button on the execution screen 50, for example.

Subsequently, the controller 10 determines whether an operation on the execution screen 50 is detected through the touch screen 2B (Step S207).

When no operation on the execution screen 50 is detected (No at Step S207) as a result of determination, the controller 10 repeats the determination at Step S207 until an operation on the execution screen 50 is detected.

When an operation on the execution screen 50 is detected (Yes at Step S207) as a result of determination, the controller 10 determines whether the detected operation is selection of an application (Step S208). The controller 10 determines whether the operation detected through the touch screen 2B is an operation on any one of the icons A1 to A5 (refer to FIG. 3) displayed on the execution screen 50.

When the detected operation is selection of an application (Yes at Step S208) as a result of determination, the controller 10 activates the selected application (Step S209) and finishes the process illustrated in FIG. 5.

By contrast, when the detected operation is not selection of an application (No at Step S208) as a result of determination, the controller 10 determines whether the detected operation is selection of reinput of voice (Step S210). The controller 10 determines whether the operation detected through the touch screen 2B is an operation on the button 50c (refer to FIG. 3) displayed on the execution screen 50.

When the detected operation is selection of reinput of voice (Yes at Step S210) as a result of determination, the controller 10 is returned to the process at Step S202, reacquires voice data received by the microphone 8, and continues to perform the process subsequent thereto.

When the detected operation is not selection of reinput of voice (No at Step S210) as a result of determination, the controller 10 determines that the operation is termination of the interactive interface and finishes the process illustrated in FIG. 5. When the operation detected through the touch screen 2B is not an operation on the button 50c, the controller 10 determines that the operation is an operation on the button 50b (refer to FIG. 3) to terminate the interactive interface and finishes the process illustrated in FIG. 5.

When the recognition of voice fails at Step S203 (No at Step S203) as a result of determination, the controller 10 determines whether the recognition of voice successively fails a certain number of times (Step S211) unlike in the process illustrated in FIG. 4.

When the recognition of voice successively fails a certain number of times (Yes at Step S211) as a result of determination, the controller 10 proceeds to the process at Step S206 and continues to perform the process subsequent thereto. The controller 10 displays the list of cooperative applications, the voice reinput button, and the end button on the execution screen 50 and waits for detection of an operation performed by the user on the execution screen 50.

When the recognition of voice does not successively fail a certain number of times (No at Step S211) as a result of determination, the controller 10 is returned to the process at Step S202, reacquires voice data received by the microphone 8, and continues to perform the process subsequent thereto. The controller 10 may output a sound guidance to urge the user to reinput voice.

The order of the process illustrated in FIG. 5 is not limited to an example illustrated in FIG. 5. For example, the determination in the process at Step S208 and the determination in the process at Step S210 may be performed in reverse order.

A Second Embodiment

In a first embodiment, when it is determined that no application corresponding to the result of voice recognition can be detected, the recognition result may be registered as a name used to activate the application. Thus, it is possible to activate the application with the same voice in subsequent processing.

The control program 9A provides a function to register, when it is determined that no application corresponding to a result of voice recognition can be detected, the recognition result as a name of an application.

The controller 10 executes the control program 9A, thereby registering, when it is determined that no application corresponding to a result of voice recognition can be detected, the recognition result as a name of an application.

An example of processing performed by the smartphone 1 according to a second embodiment will be described with reference to FIG. 6 and FIG. 7. F1 illustrated in FIG. 6 and FIG. 7 indicates the finger of the user. While the following describes an example of processing performed when what is called the lock screen 40 is displayed on the display 2A, the same processing can be performed when what is called a home screen is displayed on the display 2.

Figure 6:
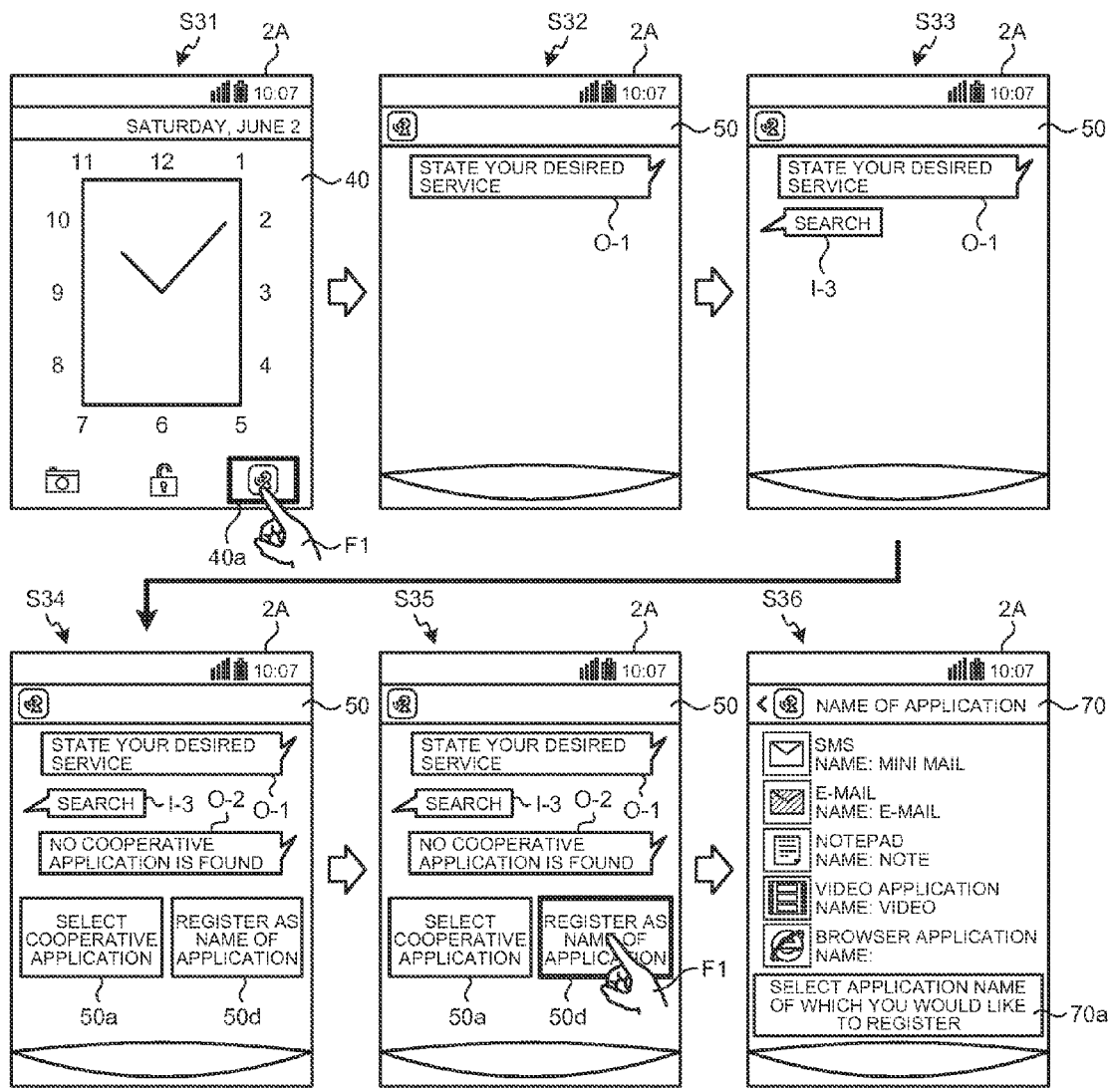
FIG. 6 is a diagram of an example of processing performed by a smartphone according to a second one of embodiments.

As illustrated in FIG. 6, the smartphone 1 displays the lock screen 40 on the display 2A. When the smartphone 1 detects an operation on the icon 40a arranged on the lock screen 40 through the touch screen 2B (Step S31), the smartphone 1 displays the execution screen 50 of the interactive interface on the display 2A (Step S32).

When voice is received by the microphone 8, the smartphone 1 performs recognition of the received voice. When it is determined that no application corresponding to the recognition result is stored in the storage 9, the smartphone 1 displays the button 50a used to display the list of applications stored in the storage 9 and a button 50d used to register the recognition result as a name of an application on the execution screen 50 (Step S33 to Step S34).

At Step S33 to Step S34 in FIG. 6, the smartphone 1 displays characters corresponding to the voice in a balloon on the execution screen 50 based on the result of recognition of the voice received by the microphone 8. The smartphone 1, for example, displays characters (I-3) of "search" on the execution screen 50. When it is determined that no application corresponding to the result of voice recognition can be detected, the smartphone 1 may output a sound guidance indicating that no application to be activated is detected and display characters corresponding to the sound guidance in a balloon on the display 2A. The smartphone 1, for example, may output a sound guidance of "no cooperative application is found" and display characters (O-2) corresponding to the sound guidance on the execution screen 50.

When the smartphone 1 detects an operation on the button 50d displayed on the execution screen 50 through the touch screen 2B (Step S35), the smartphone 1 displays a screen 70 used to select an application with which the name is to be associated (Step S36). The screen 70 displays a list of images corresponding to respective applications. Applications the name of which is already registered are displayed together with the name. As illustrated in FIG. 6, for example, a name of "mini mail" is displayed as a registered name for the SMS application 9B. The screen 70 displays a message 70a that urges the user to select registration of a name. When the screen 70 is displayed, a sound guidance corresponding to the message 70a may be output. The sound guidance alone may be output without displaying the message 70a on the screen 70 or neither display of the message 70a nor output of the sound guidance may be performed.

Figure 7:
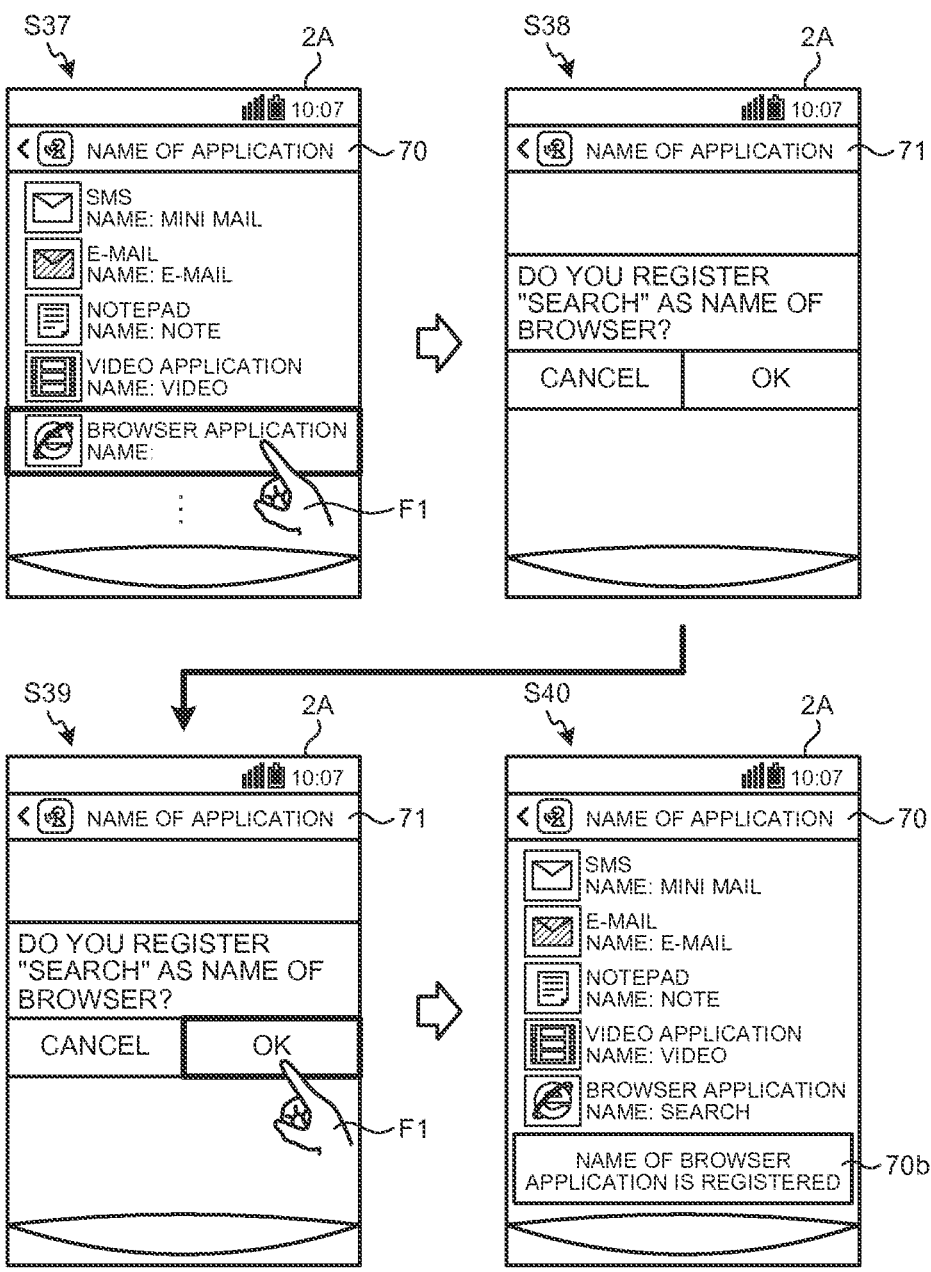
FIG. 7 is a diagram of an example of processing performed by the smartphone according to a second embodiment.

As illustrated in FIG. 7, when the smartphone 1 detects an operation on a portion corresponding to the browser application 9F displayed on the screen 70 through the touch screen 2B (Step S37), the smartphone 1 displays a confirmation screen 71 used to confirm whether to register a name on the display 2A (Step S38). The confirmation screen 71 displays a message confirming whether to register "search" as a name of the browser application 9F, an operating position used to permit registration (e.g., a position represented by OK), and an operating position used not to permit registration (e.g., a position represented by cancel).

When the smartphone 1 detects an operation on the position represented by "OK" on the confirmation screen 71 through the touch screen 2B (Step S39), the smartphone 1 registers "search" as a name of the browser application 9F and redisplays the screen 70 on the display 2A (Step S40). The screen 70 displays a message 70b indicating that the registration of the name is completed. When the screen 70 is redisplayed, a sound guidance corresponding to the message 70b may be output. The sound guidance alone may be output without displaying the message 70b on the screen 70 or neither display of the message 70b nor output of the sound guidance may be performed. After displaying the screen 70 including the message 70b indicating that the registration of the name is completed, the smartphone 1 finishes the processing illustrated in FIG. 6 and FIG. 7. The smartphone 1 then displays the lock screen 40 or what is called a home screen on the display 2A, for example.

When the smartphone 1 detects an operation on the position represented by "cancel" on the confirmation screen 71 through the touch screen 2B at Step S39, the smartphone 1 may redisplay the execution screen 50 displayed at Step S34 or terminate the interactive interface.

Figure 8:
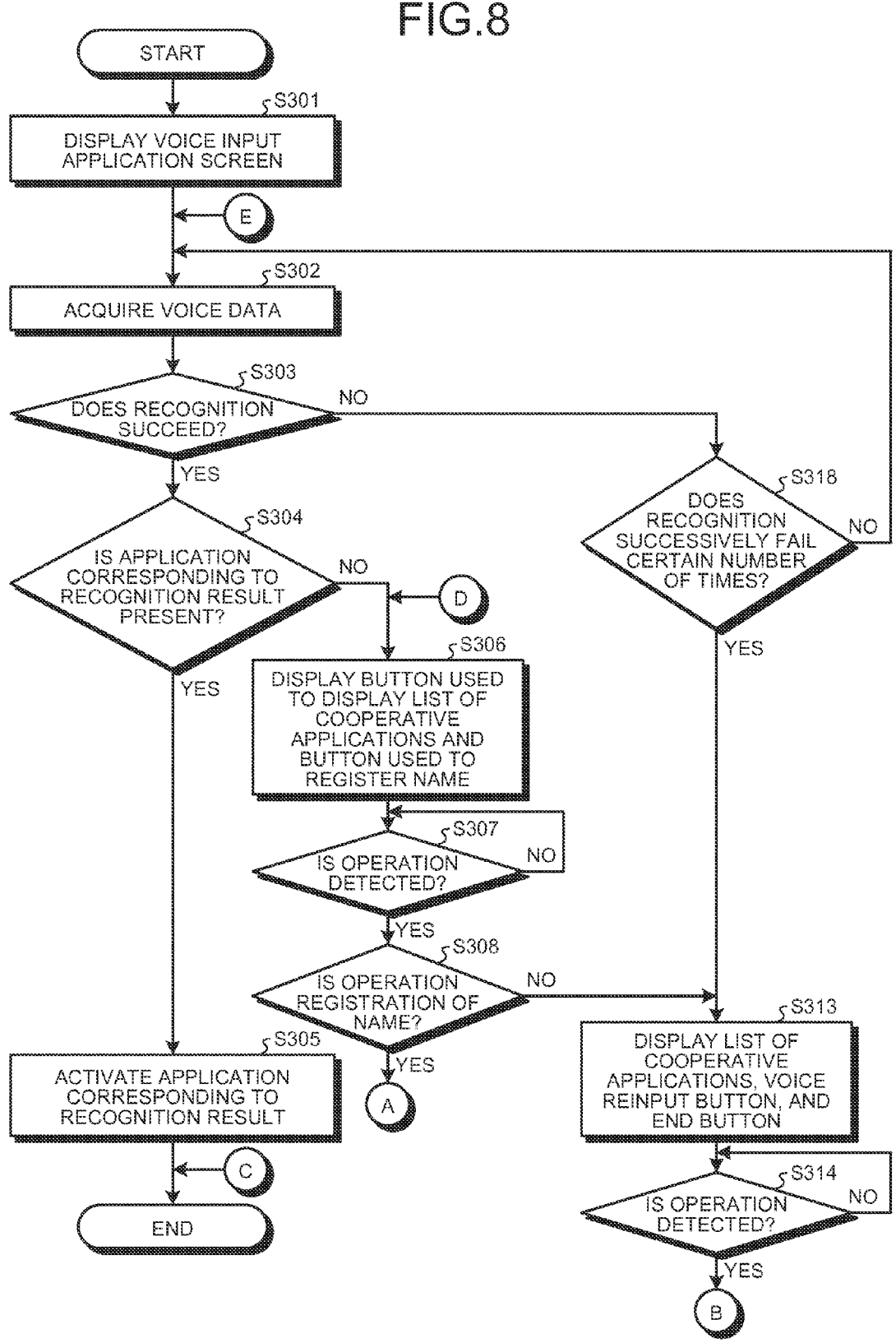
FIG. 8 is a flowchart of an example of a process performed by the smartphone according to a second embodiment.
Figure 9:
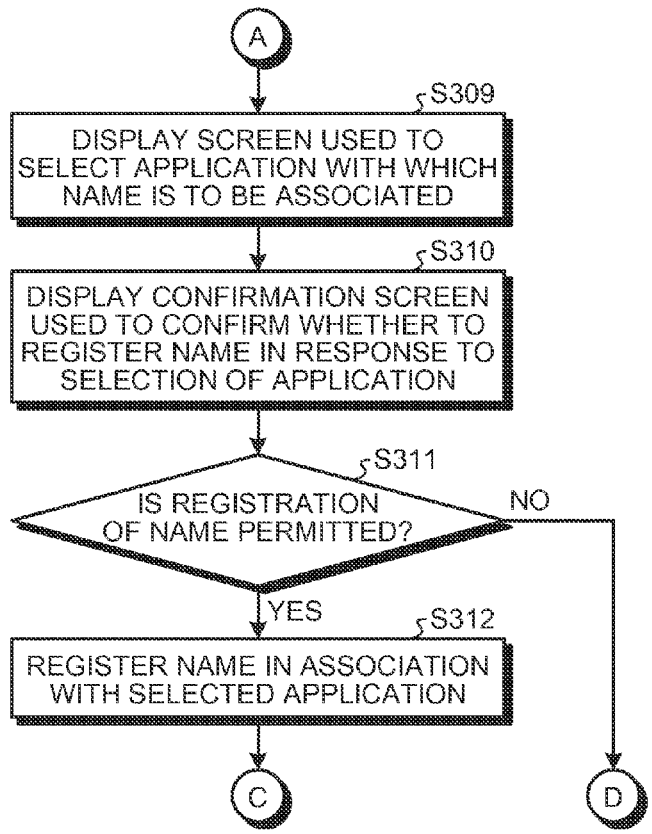
FIG. 9 is a flowchart of an example of a process performed by the smartphone according to a second embodiment.
Figure 10:
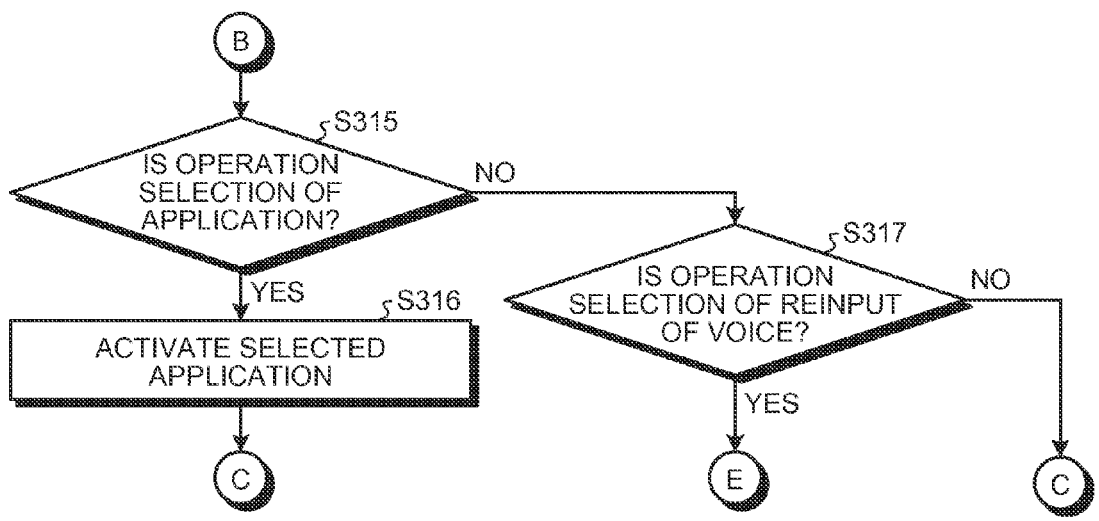
FIG. 10 is a flowchart of an example of a process performed by the smartphone according to a second embodiment.

The following describes an example of a process performed by the smartphone 1 according to a second embodiment with reference to FIG. 8 to FIG. 10. The process illustrated in FIG. 8 to FIG. 10 is performed by the controller 10 executing the control program 9A and the like stored in the storage 9. The process illustrated in FIG. 8 to FIG. 10 includes the process at Step S306 to Step S313 besides the process (FIG. 5) described in a first embodiment.

As illustrated in FIG. 8, the controller 10 displays the execution screen 50 of the interactive interface on the display 2A (Step S301).

When the controller 10 acquires voice data of voice received by the microphone 8 (Step S302), the controller 10 performs recognition of the voice data and determines whether the recognition of voice succeeds (Step S303).

When the recognition of voice succeeds (Yes at Step S303) as a result of determination, the controller 10 determines whether an application corresponding to the recognition result can be detected out of the applications stored in the storage 9 (Step S304).

When an application corresponding to the recognition result can be detected (Yes at Step S304) as a result of determination, the controller 10 activates the corresponding application (Step S305) and finishes the process.

By contrast, when no application corresponding to the recognition result can be detected (No at Step S304) as a result of determination, the controller 10 displays the button 50a used to display the list of cooperative applications and the button 50d (refer to FIG. 6) used to register a name on the execution screen 50 (Step S306).

Subsequently, the controller 10 determines whether an operation on the execution screen 50 is detected through the touch screen 2B (Step S307).

When no operation on the execution screen 50 is detected (No at Step S307) as a result of determination, the controller 10 repeats the determination at Step S307 until an operation on the execution screen 50 is detected.

When an operation on the execution screen 50 is detected (Yes at Step S307) as a result of determination, the controller 10 determines whether the detected operation is registration of a name (Step S308). The controller 10 determines whether the operation detected through the touch screen 2B is an operation on the button 50d (refer to FIG. 6) displayed on the execution screen 50.

When the detected operation is registration of a name (Yes at Step S308) as a result of determination, the controller 10 displays the screen 70 (refer to FIG. 7) used to select an application with which the name is to be associated on the display 2A as illustrated in FIG. 9 (Step S309).

Subsequently, the controller 10 displays the confirmation screen 71 used to confirm whether to register the name on the display 2A in response to selection of an application on the screen 70 detected through the touch screen 2B (Step S310).

Subsequently, the controller 10 determines whether registration of the name is permitted (Step S311). The controller 10 determines whether an operation on the position represented by "OK" (refer to FIG. 7) on the confirmation screen 71 is detected.

When registration of the name is permitted (Yes at Step S311) as a result of determination, the controller 10 registers the name in association with the selected application (Step S312) and finishes the process. The controller 10 registers the recognition result obtained at Step S303 as the name in association with the application selected at Step S309. The controller 10 stores the data of the name associated with the application in the setting data 9Z in the storage 9, for example.

When registration of the name is not permitted (No at Step S311) as a result of determination, the controller 10 is returned to Step S306. The controller 10 redisplays, on the display 2A, the execution screen 50 with the button 50a and the button 50d displayed thereon. The controller 10 responds to a change in mind of the user from registering the name to displaying the list of applications, for example. The controller 10 is not necessarily returned to Step S306 and may finish the process, for example.

When the detected operation is not registration of a name at Step S308 (No at Step S308) as a result of determination, the controller 10 determines that the detected operation is display of the list of applications and the like. The controller 10 displays the list of cooperative applications, the voice reinput button, and the end button on the execution screen 50 as illustrated in FIG. 8 (Step S313).

Subsequently, the controller 10 determines whether an operation on the execution screen 50 is detected through the touch screen 2B (Step S314).

When no operation on the execution screen 50 is detected (No at Step S314) as a result of determination, the controller 10 repeats the determination at Step S314 until an operation on the execution screen 50 is detected.

When an operation on the execution screen 50 is detected (Yes at Step S314) as a result of determination, the controller 10 determines whether the detected operation is selection of an application as illustrated in FIG. 10 (Step S315). The controller 10 determines whether the operation detected through the touch screen 2B is an operation on any one of the icons A1 to A5 (refer to FIG. 3) displayed on the execution screen 50.

When the detected operation is selection of an application (Yes at Step S315) as a result of determination, the controller 10 activates the selected application (Step S316) and finishes the process.

By contrast, when the detected operation is not selection of an application (No at Step S315) as a result of determination, the controller 10 determines whether the detected operation is selection of reinput of voice (Step S317). The controller 10 determines whether the operation detected through the touch screen 2B is an operation on the button 50c (refer to FIG. 3) displayed on the execution screen 50.

When the detected operation is selection of reinput of voice (Yes at Step S317) as a result of determination, the controller 10 is returned to the process at Step S302, reacquires voice data received by the microphone 8, and continues to perform the process subsequent thereto.

When the detected operation is not selection of reinput of voice (No at Step S317) as a result of determination, the controller 10 determines that the operation is termination of the interactive interface and finishes the process. When the operation detected through the touch screen 2B is not an operation on the button 50c, the controller 10 determines that the operation is an operation on the button 50b (refer to FIG. 3) to terminate the interactive interface and finishes the process.

When the recognition of voice fails at Step S303 (No at Step S303) as a result of determination, the controller 10 determines whether the recognition of voice successively fails a certain number of times (Step S318).

When the recognition of voice successively fails a certain number of times (Yes at Step S318) as a result of determination, the controller 10 proceeds to the process at Step S313 and continues to perform the process subsequent thereto. The controller 10 displays the list of cooperative applications, the voice reinput button, and the end button on the execution screen 50 and waits for detection of an operation performed by the user on the execution screen 50.

When the recognition of voice does not successively fail a certain number of times (No at Step S318) as a result of determination, the controller 10 is returned to the process at Step S302, reacquires voice data received by the microphone 8, and continues to perform the process subsequent thereto. The controller 10 may output a sound guidance to urge the user to reinput voice.

The order of the process illustrated in FIG. 8 to FIG. 10 is not limited to an example illustrated in FIG. 8 to FIG. 10. For example, the process at Step S315 and the process at Step S317 may be performed in reverse order. The process illustrated in FIG. 8 to FIG. 10 does not necessarily include all the process illustrated in the figures. The process does not necessarily include the process at Step S318, for example.

The characteristic embodiments have been described in order to disclose the technique according to the enclosed claims completely and clearly. However, the enclosed claims should not be limited to the above-described embodiments, and should be embodied by all modifications and substitutable configurations that can be made by a person skilled in the art of the technical field in a range of fundamental matters described in the specification.

The control program 9A and the applications illustrated in FIG. 1 may be divided into a plurality of modules, for example. Alternatively, the control program 9A illustrated in FIG. 1 may be combined with another computer program.

In the above-described embodiments, the smartphone has been described as an example of the device including a touch screen. However, the device according to the enclosed claims is not limited to a smartphone. The device according to the enclosed claims may be an electronic device other than a smartphone. The electronic device includes a mobile phone, a tablet, a portable personal computer, a digital camera, a media player, an electronic book reader, a navigator, and a game machine, for example. Alternatively, the device according to the enclosed claims may be a stationary electronic device. The stationary electronic device includes a desktop personal computer and a television receiver, for example.

While the interactive interface according to embodiments above responds to voice input with a sound guidance and display on the display, an interface that responds to voice input with any one of them may be employed.

The interactive interface according to embodiments above can activate an application in response to voice input. When an application to be activated in response to voice input is already activated, the smartphone 1 executes the application. In embodiments above, the case where the smartphone 1 (controller 10) activates a computer program (or an application) includes a case where the smartphone 1 (controller 10) newly reads a computer program stored in the storage 9 to start processing and a case where the smartphone 1 (controller 10) newly starts processing of an already read computer program. In embodiments above, the case where the smartphone 1 (controller 10) executes a computer program includes a case where the smartphone 1 (controller 10) activates a computer program, a case where the smartphone 1 (controller 10) resumes a suspended computer program, and a case where the smartphone 1 (controller 10) continues to perform processing of an already activated computer program.

The invention claimed is:

1. An electronic device, comprising:
a microphone;
a storage configured to store a list of a plurality of applications;
a display unit configured to display the list of the plurality of applications; and
a controller configured to, based on a result of recognition of voice received by the microphone, perform a detecting process to detect, from the list, an application that corresponds to the result of the recognition,
wherein
the controller is configured to,
when the application that corresponds to the result of the recognition is detected in the list, activate the application that corresponds to the result of the recognition, and
when the application that corresponds to the result of the recognition is not detected in the list, perform a displaying process that displays, from the list, an application that enables input of character information, and
the controller is configured to,
in response to a selection of an application from the displayed list of the plurality of applications,
transmit a character string corresponding to the result of the recognition to the selected application.

2. A control method for controlling an electronic device including a microphone, a display unit, and a storage, the control method comprising:
storing, in the storage, a list of a plurality of applications;
displaying, by the display unit, the list of the plurality of applications;
performing recognition of voice received by the microphone;
performing a detecting process to detect, from the list, an application that corresponds to a result of the recognition;
when the application that corresponds to the result of the recognition is detected in the list, activating the application that corresponds to the result of the recognition;
when the application that corresponds to the result of the recognition is not detected in the list, performing a displaying process that displays, from the list, an application that enables input of character information; and
in response to a selection of an application from the displayed list of the plurality of applications, transmitting a character string corresponding to the result of the recognition to the selected application.

3. A non-transitory storage medium that stores a control program causing, when executed by an electronic device including a microphone, a display unit, and a storage, the electric device to execute:
storing, in the storage, a list of a plurality of applications;
displaying, by the display unit, the list of the plurality of applications;
performing recognition of voice received by the microphone;
performing a detecting process to detect, from the list, an application that corresponds to a result of the recognition;
when the application that corresponds to the result of the recognition is detected in the list, activating the application that corresponds to the result of the recognition;
when the application that corresponds to the result of the recognition is not detected in the list, performing a displaying process that displays, from the list, an application that enables input of character information; and
in response to a selection of an application from the displayed list of the plurality of applications, transmitting a character string corresponding to the result of the recognition to the selected application.

4. The electronic device according to claim 1,
wherein
the controller is configured to,
in response to another selection of another application from the displayed list of the plurality of applications,
register a name of the another selected application.

5. The electronic device according to claim 4, wherein
the controller is configured to
compare the name with the result of recognition, and
when the result of recognition includes the name, execute the another selected application.

6. The electronic device according to claim 1, wherein the application that corresponds to the result of the recognition is not detected in the list when
the recognition fails, or
the application corresponding to the result of the recognition does not exist in the list in the storage when the recognition succeeds.

7. The electronic device according to claim 1, wherein the selected application is configured to enable input of character information.

8. The electronic device according to claim 7, wherein the controller is configured to transmit the character string to a search input box of the selected application.

9. The electronic device according to claim 6, wherein the controller is configured to,
when the recognition fails,
allow reinputting voice through the microphone up to a certain number of times before causing the display unit to display the list of the plurality of applications on the execution screen.

10. An electronic device, comprising:
a microphone;
a storage configured to store a list of a plurality of applications;
a display unit; and
a controller configured to, based on a result of recognition of voice received by the microphone, perform a detecting process to detect, from the list, an application that corresponds to the result of the recognition,
wherein
the controller is configured to,
when the application that corresponds to the result of the recognition is detected in the list, activate the application that corresponds to the result of the recognition, and
when the application that corresponds to the result of the recognition is not detected in the list, perform a displaying process that displays, from the list, an application that enables input of character information,
the display unit is configured to, when the recognition succeeds, display a character string corresponding to the result of the recognition on an execution screen, and
the controller is configured to, when the application that corresponds to the result of the recognition is not detected in the list, cause the display unit to display a button on the execution screen, and when said button is selected, cause the display unit to display, simultaneously with the character string, the list of the plurality of applications on the execution screen.

11. The electronic device according to claim 10, wherein the controller is configured to cause the display unit to display, with each application on the list, first and second character strings different from each other and associated with said application, the first character string is an application name of said application, and the second character string is a name registered to activate said application based on the result of recognition of voice.

12. A control method for controlling an electronic device including a microphone, a display unit, and a storage, the control method comprising:

storing, in the storage, a list of a plurality of applications;

performing recognition of voice received by the microphone;

performing a detecting process to detect, from the list, an application that corresponds to a result of the recognition;

when the application that corresponds to the result of the recognition is detected in the list, activating the application that corresponds to the result of the recognition;

when the application that corresponds to the result of the recognition is not detected in the list, performing a displaying process that displays, from the list, an application that enables input of character information;

when the recognition succeeds, displaying, by the display unit, a character string corresponding to the result of the recognition on an execution screen; and when the application that corresponds to the result of the recognition is not detected in the list, displaying a button on the execution screen, and when said button is selected, displaying, simultaneously with the character string, the list of the plurality of applications on the execution screen.

13. A non-transitory storage medium that stores a control program causing, when executed by an electronic device including a microphone, a display unit, and a storage, the electric device to execute:

storing, in the storage, a list of a plurality of applications;

performing recognition of voice received by the microphone;

performing a detecting process to detect, from the list, an application that corresponds to a result of the recognition;

when the application that corresponds to the result of the recognition is detected in the list, activating the application that corresponds to the result of the recognition;

when the application that corresponds to the result of the recognition is not detected in the list, performing a displaying process that displays, from the list, an application that enables input of character information;

when the recognition succeeds, displaying, by the display unit, a character string corresponding to the result of the recognition on an execution screen; and when the application that corresponds to the result of the recognition is not detected in the list, displaying a button on the execution screen, and when said button is selected, displaying, simultaneously with the character string, the list of the plurality of applications on the execution screen.

14. The electronic device according to claim 1, wherein, when a lock screen is displayed on the display unit, the controller is configured to cause the display unit to display an icon on the lock screen, and perform, when a predetermined operation is detected on the icon, the detecting process.

15. The electronic device according to claim 1, wherein the controller is configured to cause the display unit to chronologically display, a first balloon including a first text string that corresponds to a sound guidance, and a second balloon including a second text string corresponding to the result of the recognition of the voice, and an orientation of a tail of the first balloon and an orientation of a tail of the second balloon are different from each other.

16. The electronic device according to claim 15, further comprising:

a speaker, wherein the controller is configured to simultaneously cause, the speaker to output the sound guidance, and the display unit to display the first text string corresponding to the sound guidance.

17. The electronic device according to claim 10, wherein, when a lock screen is displayed on the display unit, the controller is configured to cause the display unit to display an icon on the lock screen, and perform, when a predetermined operation is detected on the icon, the detecting process.

18. The electronic device according to claim 10, wherein the controller is configured to cause the display unit to chronologically display, a first balloon including a first text string that corresponds to a sound guidance, and a second balloon including a second text string corresponding to the result of the recognition of the voice, and an orientation of a tail of the first balloon and an orientation of a tail of the second balloon are different from each other.

19. The electronic device according to claim 18, further comprising:

a speaker, wherein the controller is configured to simultaneously cause, the speaker to output the sound guidance, and the display unit to display the first text string corresponding to the sound guidance.

* * * * *